(12) United States Patent
Rivera

(10) Patent No.: US 9,682,851 B2
(45) Date of Patent: Jun. 20, 2017

(54) SCOOP AND FUNNEL

(71) Applicant: Adrian Rivera, Whittier, CA (US)

(72) Inventor: Adrian Rivera, Whittier, CA (US)

(*) Notice: Subject to any disclaimer, the term of this patent is extended or adjusted under 35 U.S.C. 154(b) by 1 day.

(21) Appl. No.: 14/820,762

(22) Filed: Aug. 7, 2015

(65) Prior Publication Data
US 2016/0257548 A1 Sep. 8, 2016

Related U.S. Application Data

(63) Continuation-in-part of application No. 14/640,763, filed on Mar. 6, 2015.

(51) Int. Cl.
*B67C 11/02* (2006.01)
*G01F 19/00* (2006.01)
*A47J 43/28* (2006.01)

(52) U.S. Cl.
CPC ............ *B67C 11/02* (2013.01); *A47J 43/28* (2013.01); *G01F 19/002* (2013.01)

(58) Field of Classification Search
CPC ......... A47J 43/28; B67C 11/02; G01F 19/002
USPC ................................................ 141/331–345
See application file for complete search history.

(56) References Cited

U.S. PATENT DOCUMENTS

| | | | |
|---|---|---|---|
| 1,708,456 A * | 4/1929 | Tunick | A47G 21/04 206/216 |
| 2,034,733 A * | 3/1936 | Wilkins | G01N 1/08 30/324 |
| 2,259,504 A * | 10/1941 | Wilson | G01F 19/002 30/326 |
| 3,603,358 A * | 9/1971 | Mallindine | B44D 3/128 141/343 |
| 4,788,862 A * | 12/1988 | Fuller | G01F 19/002 16/225 |
| 6,035,907 A | 3/2000 | DeCoster | |
| 6,974,056 B2 | 12/2005 | Rea | |
| D554,449 S * | 11/2007 | Stewart | D10/46.3 |
| 7,441,676 B2 | 10/2008 | Pickering, Jr. | |
| 9,055,844 B2 * | 6/2015 | Schuelke | B65D 25/48 |
| 2005/0017028 A1 * | 1/2005 | Rea | G01F 19/002 222/460 |
| 2005/0173467 A1 * | 8/2005 | Pickering | G01F 19/002 222/460 |
| 2009/0107581 A1 | 4/2009 | Sayage | |
| 2014/0083555 A1 | 3/2014 | Allen | |
| 2015/0069092 A1 * | 3/2015 | Schuelke | B65D 25/48 222/460 |

(Continued)

OTHER PUBLICATIONS

Flip Funnel Youtube Video Screen Shot Published Aug. 14, 2014.

*Primary Examiner* — Nicolas A Arnett
(74) *Attorney, Agent, or Firm* — Kenneth L. Green; Averill & Green

(57) ABSTRACT

A single serving scoop and funnel both conveniently measures a correct amount of any liquid, gel, solid, granulated, or any pourable material, and facilitates pouring the measured material into a container. The funnel is moveably attached to a scoop handle, and may be moved between a first position over the scoop, and a second position withdrawn from the scoop. In one embodiment the funnel is hingedly attached to the scoop handle and rotates 180 degrees to latch opposite to the scoop, and may contain projections on each side of a funnel handle allowing single had use. In another embodiment the funnel slides along the handle away from the scoop.

21 Claims, 8 Drawing Sheets

(56) References Cited

U.S. PATENT DOCUMENTS

2016/0256012 A1\* 9/2016 Rivera .................... A47J 43/28

\* cited by examiner

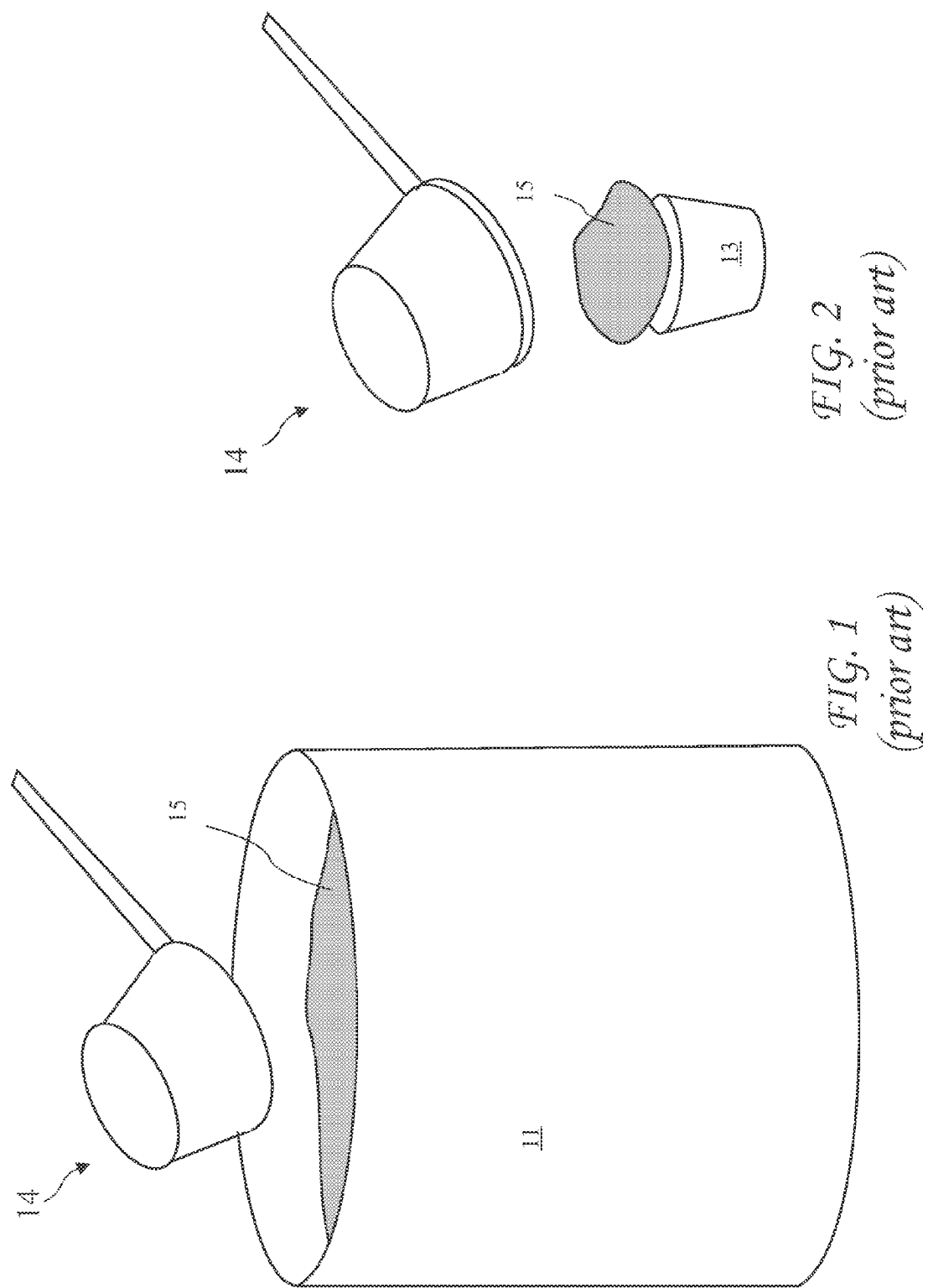

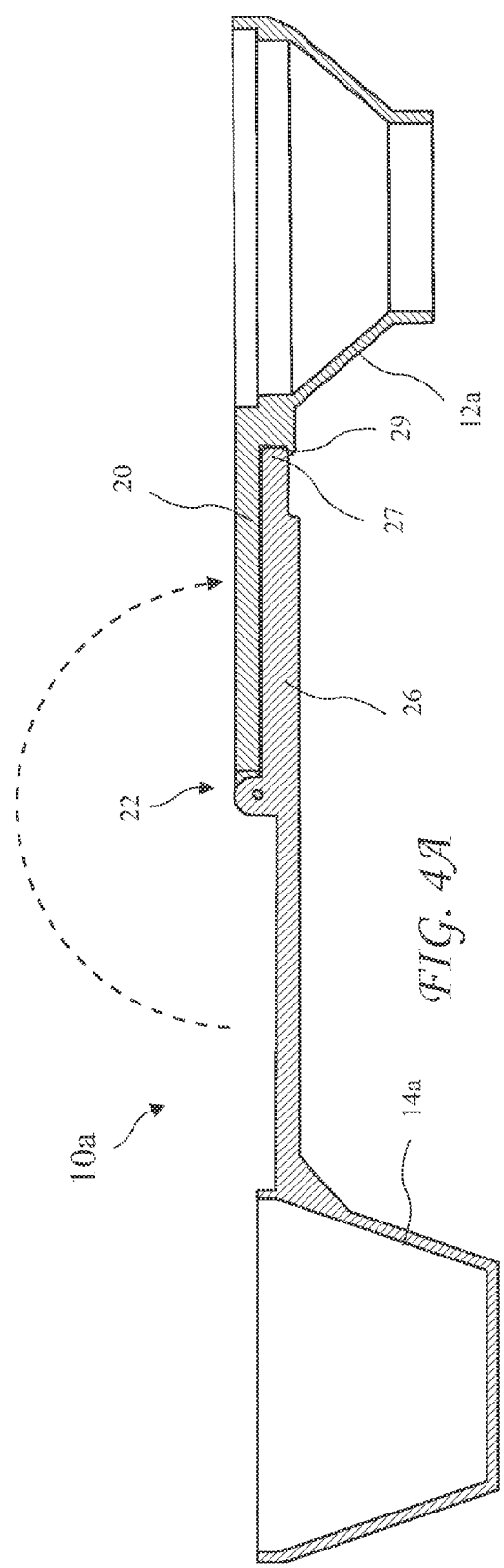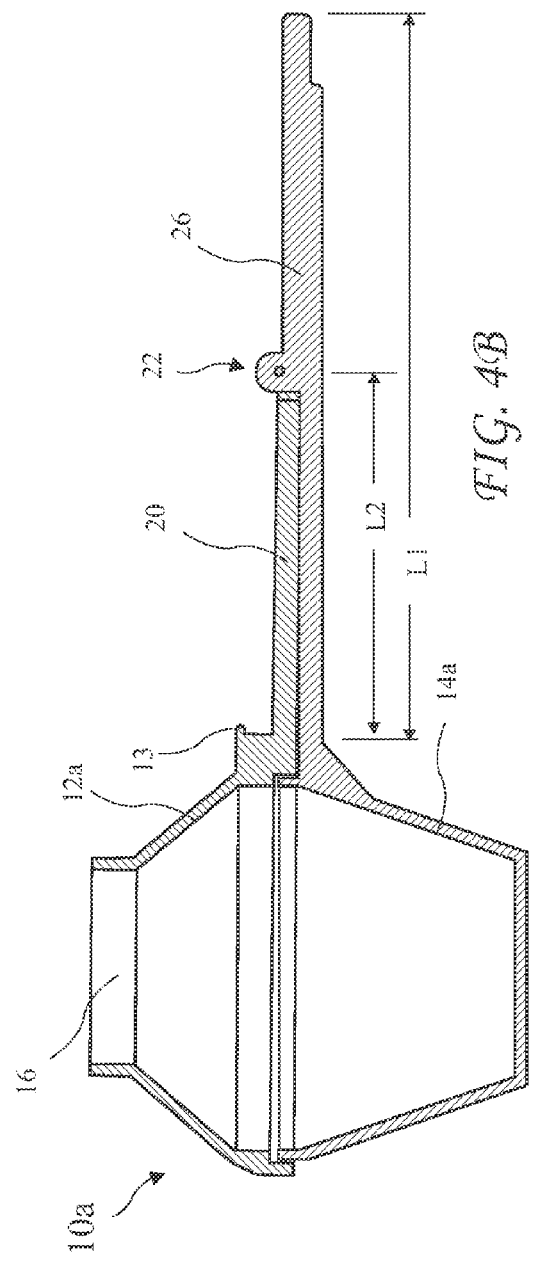

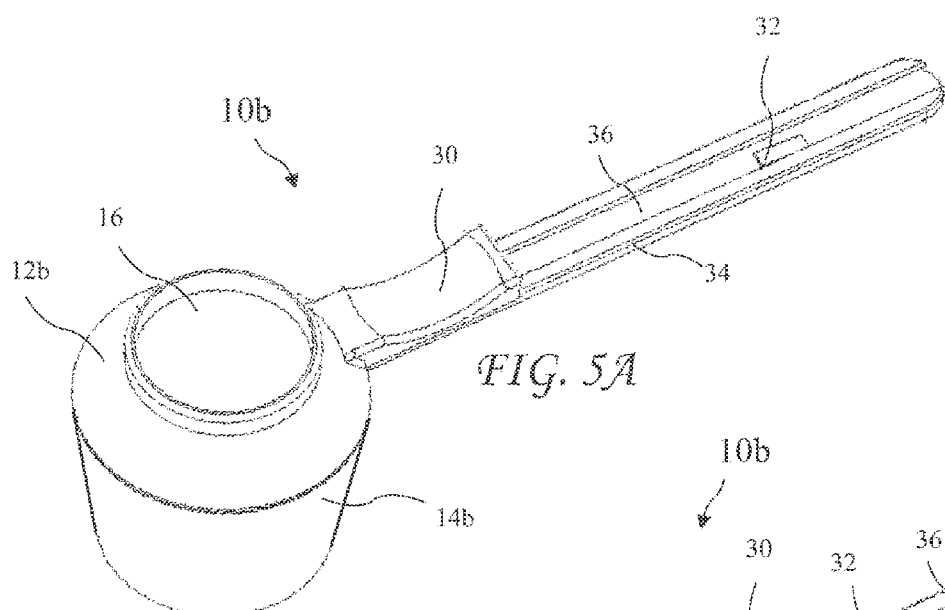
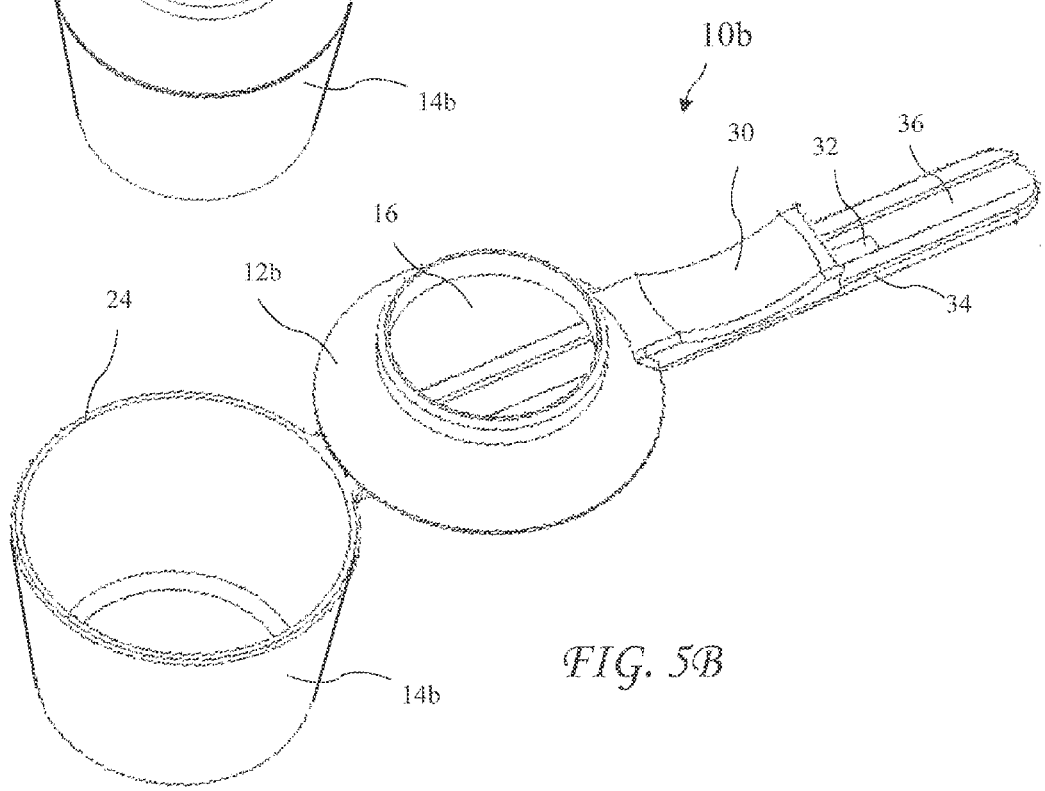

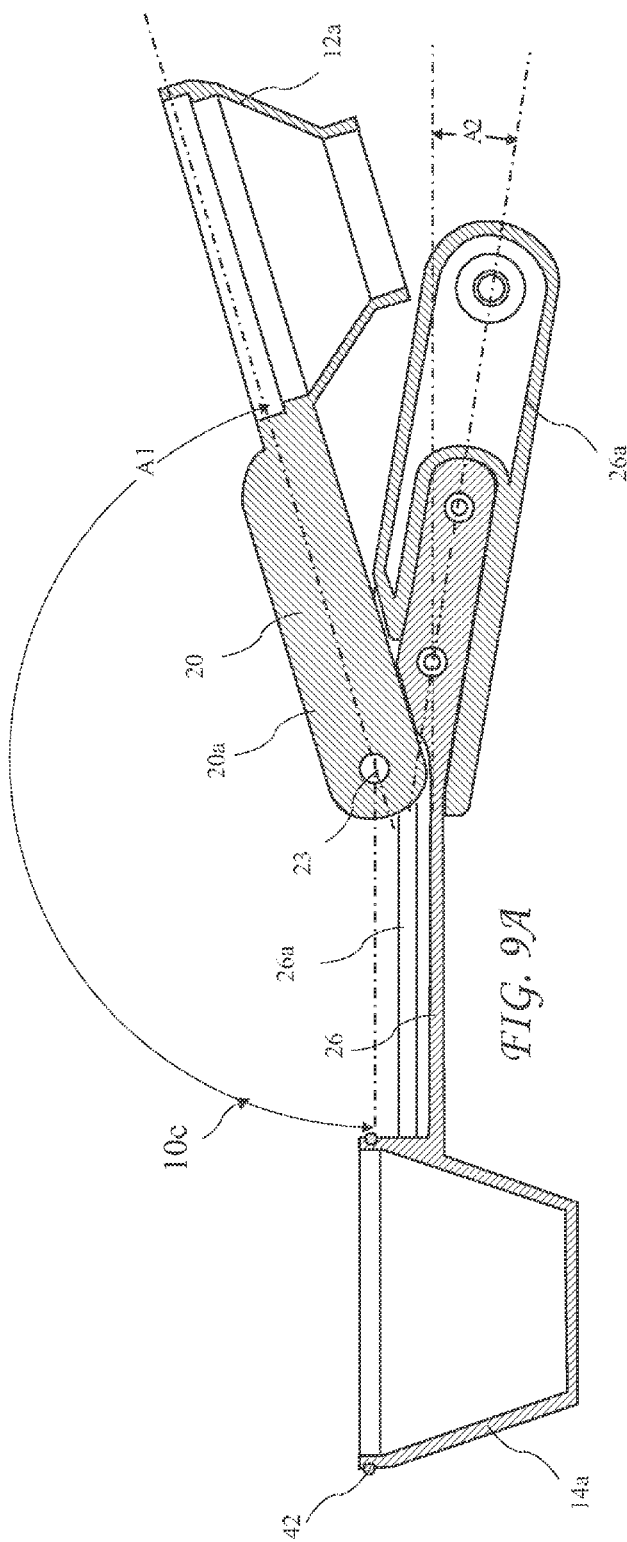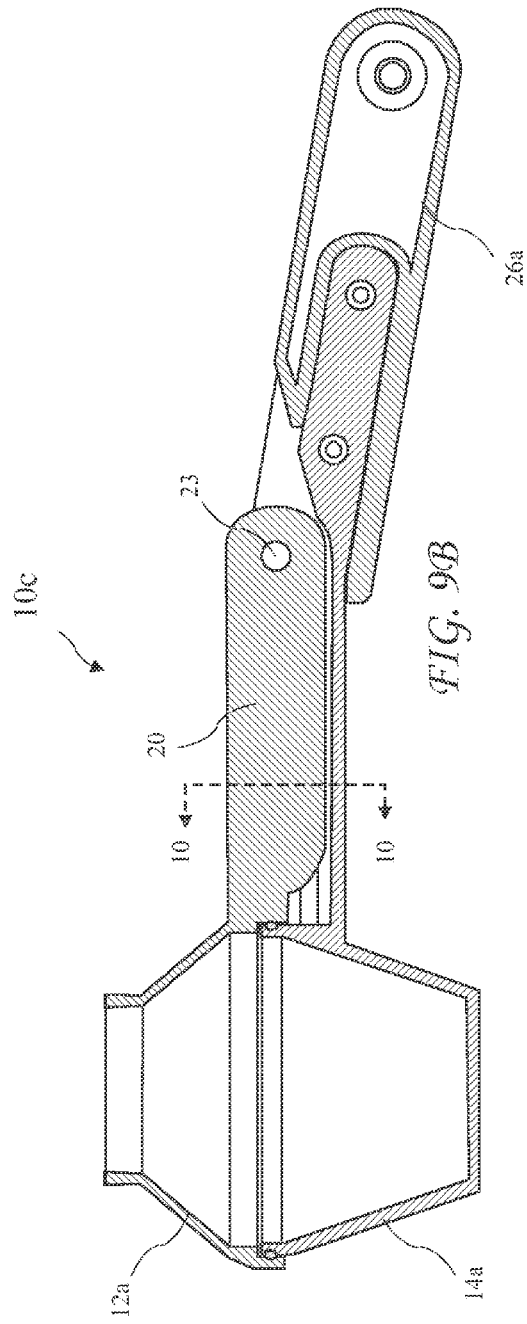

SCOOP AND FUNNEL

CROSS-REFERENCE TO RELATED APPLICATIONS

The present application is a Continuation In Part of U.S. patent application Ser. No. 14/640,763 filed Mar. 6, 2015, which application is incorporated in its entirety herein by reference.

BACKGROUND OF THE INVENTION

The present invention relates to measuring and pouring material into a small mouth container and in particular to measuring and pouring a liquid, gel, solid, granulated, or any pourable material when one hand is required to be free to hold the container.

Users are often required to measure and poor small quantities of liquid and solid material into a small mouth container. It is often difficult to pour the liquid and solid material without spilling. In some instances it is possible to hold a funnel, but when the user must hold both a measuring cup and a small mouth container, it is very difficult to also hold the funnel, often resulting in spilling the liquid or solid material.

Single serving beverage brewers have become extremely popular. Originally, these brewers were designed to use a disposable single serving cartridge. The cost of the disposable single serving cartridges, and the resulting volume of non-biodegradable material has motivated the development of reusable holders which accept a single serving of brewing extract and fit into the single serving beverage brewers. While such holders have become very popular, one drawback is that in order to fit into brewing chambers of the single serving beverage brewers, the holders are small, and it is difficult to pour a single serving of brewing extract into the holders with some of the brewing extract spilling.

Known designs such as disclosed in U.S. Pat. No. 7,441,676 to Pickering and US Patent Application Publication No. 2014/0083555 to Allen show a funnel hingedly attached to a side of a scoop, extending at about a 45 degree angle from a handle. While such designs are suitable for some applications, they are not suitable for scooping brewing extract from typical brewing extract containers because the funnel interferes with scooping the brewing extract.

BRIEF SUMMARY OF THE INVENTION

The present invention addresses the above and other needs by providing a single serving scoop and funnel which both conveniently measures a correct amount of any liquid, gel, solid, granulated, or any pourable material, and facilitates pouring the measured beverage extract into a container. The funnel is moveably attached to a scoop handle, and may be moved between a first position over the scoop, and a second position withdrawn from the scoop. In one embodiment the funnel is hingedly attached to the scoop handle and rotates between 120 and 180 degrees to latch opposite to the scoop. In another embodiment the funnel slides along the handle away from the scoop.

In accordance with one aspect of the invention, there is provided a single serving scoop and funnel having a pivoting funnel. A hinge at the base of a funnel arm engages a midpoint of the scoop handle, and the funnel pivots between 120 and 180 degrees, and preferably between 160 and 170 degrees, and most preferably 165 degrees, to a position opposite to the scoop and snaps into place. The length of the scoop handle is free for grasping and the funnel does not interfere with scooping brewing extract. The funnel and scoop may include cooperating features to snap the funnel into position against the scoop handle.

In accordance with another aspect of the invention, there is provided a scoop and funnel having a pivoting funnel with lateral projections on each side of a funnel handle allowing single handed operation. The projections may be attached near a funnel hinge, and the user may hold the scoop and funnel and flip the funnel over the scoop with a free finger or thumb while holding a container in the other hand.

In accordance with yet another aspect of the invention, there is provided a single serving scoop and funnel having a sliding funnel. The funnel slides along the scoop handle from a position over the scoop for pouring to a position separated from the scoop for scooping. When the funnel is separated from the scoop, the funnel does not interfere with scooping brewing extract.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 shows a scoop scooping brewing extract from a container.

FIG. 2 shows the scoop pouring the brewing extract into an extract holder.

FIG. 4A shows a side view of the single serving scoop and pivoting funnel according to the present invention with the funnel residing away from the scoop.

FIG. 4B shows a side view of the single serving scoop and pivoting funnel according to the present invention with the funnel fully pivoted to reside over the scoop.

FIG. 5A shows a perspective view of a single serving scoop and sliding funnel according to the present invention with the funnel residing over the scoop.

FIG. 5B shows a perspective view of the single serving scoop and sliding funnel according to the present invention with the funnel residing over a scoop handle.

FIG. 9A shows a cross-sectional side view of the single serving scoop and pivoting funnel according to the present invention taken along line 9A-9A of FIG. 8A with the funnel residing opposite to the scoop.

FIG. 9B shows a cross-sectional side view of the single serving scoop and pivoting funnel according to the present invention taken along line 9B-9B of FIG. 8C with the funnel fully pivoted to reside over the scoop.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the term "generally" is associated with an element of the invention, it is intended to describe a feature's appearance to the human eye, and not a precise measurement. For example, when an element is described as generally horizontal, it is intended to describe an element which at least appears to be horizontal to the human eye, and not necessarily horizontal if measured by an instrument.

A scoop 14 is shown scooping brewing extract 15 from a container 13 in FIG. 1 and the scoop 14 is shown pouring the brewing extract 15 into an extract holder 13 in FIG. 2. The extract holder 13 is used in a single serving brewer and must fit into the brewing cavity of the brewer, thus limiting the size of the extract holder 13. As a result, it is often difficult to pour the brewing extract 15 into the extract holder 13 without spilling some of the brewing extract.

Figure 3A:
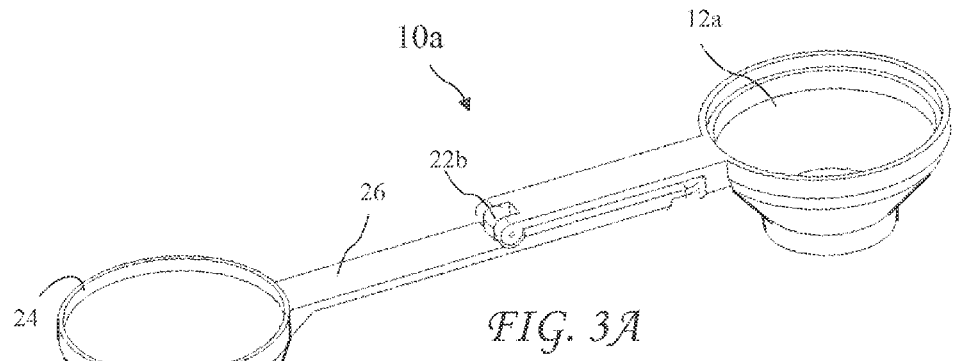
FIG. 3A shows a perspective view of single serving scoop and pivoting funnel, the funnel pivoted away from the scoop according to the present invention.
Figure 3B:
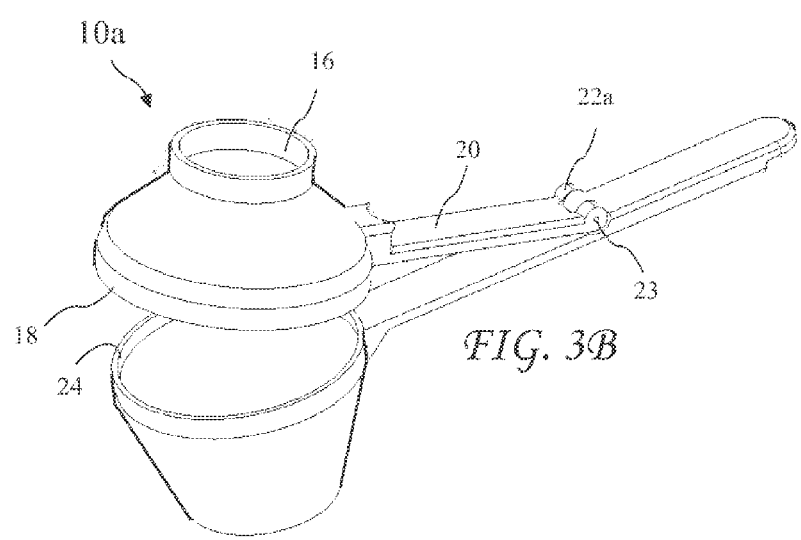
FIG. 3B shows perspective view of the single serving scoop and pivoting funnel according to the present invention with the funnel partially pivoted towards the scoop.
Figure 3C:
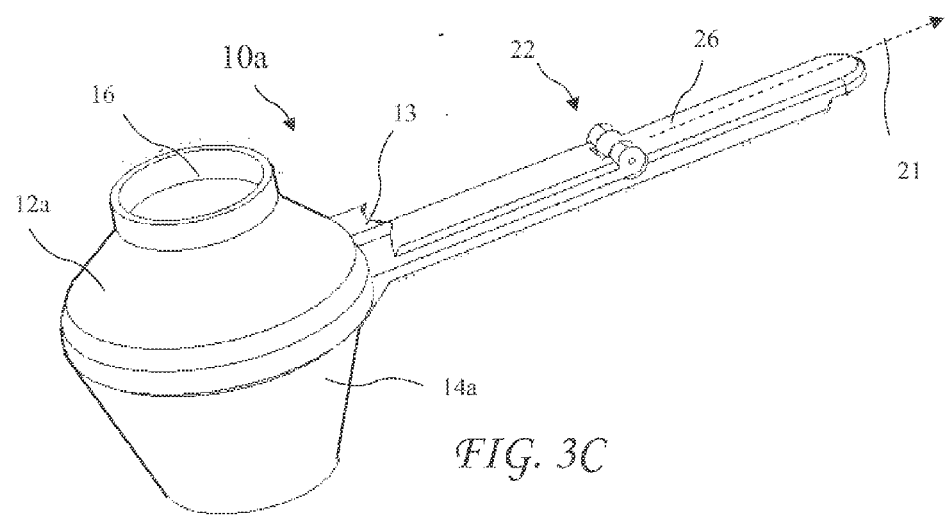
FIG. 3C shows a perspective view of the single serving scoop and pivoting funnel according to the present invention with the funnel fully pivoted over the scoop.

A perspective view of single serving scoop and pivoting funnel 10a, the funnel 12a pivoted away from the scoop 14a in a scooping position, according to the present invention, is shown in FIG. 3A, a perspective view of the single serving scoop and pivoting funnel 10a with the funnel 12a partially pivoted towards the scoop 14a is shown in FIG. 3B, and a perspective view of the single serving scoop and pivoting funnel 10a with the funnel 12a fully pivoted over the scoop 14a in a pouring position is shown in FIG. 3C. The combination of the scoop 14a and funnel 12a permits scooping and pouring brewing extract 15 (or any a liquid, gel, solid, granulated, or any pourable material) into the extract holder 13 without spilling the brewing extract material. The scoop 14a includes a scoop mouth 24 for scooping the brewing extract 15 from the container 11, and a scoop handle 26 extending generally horizontally from the scoop 14a. The funnel 12a includes a base 18 matched to close against the scoop mouth 24 and a pouring mouth 16 for pouring a measured amount of material.

The funnel 12a and funnel handle 20 rotate around pivot 22 from the position opposite to the scoop 14a for scooping brewing extract, to a position over the scoop 14a for pouring the beverage extract into a holder used in a beverage brewer. The pivot 22 is generally centered on the scoop handle 26 and preferably comprises a scoop handle portion 22a and a funnel handle portion 22b connected by a pin (or hinge or pivot axis) 23. In either position, the funnel handle 20 may rest against a scoop handle 26, and the act of grasping the scoop handle 26 holds the funnel 12a in position. The scoop handle reaches in a handle direction 21 from the scoop 14a.

While the funnel 12a is shown having the pouring mouth 16 opposite to the base 18, the pouring mouth may be on the side of the funnel 12a or any position on the funnel 12a separated from (i.e., not overlapping) the base 18.

A side view of the single serving scoop and pivoting funnel 10a with the funnel 12a residing away from scoop 14a is shown in FIG. 4A, and a side view of the single serving scoop and pivoting funnel 10a with the funnel 12a fully rotated around the pivot 22 to close against the scoop 14a is shown in FIG. 4B. The funnel 12a may include a tab 29 projecting towards the pivot 22, and in the fully rotated position of FIG. 4A, the tab 29 overlaps a scoop handle end 27 of the scoop holding the funnel 12a, to hold the funnel 12a in the fully rotated position. The scoop handle 26 has a length L1 of preferably between three and five inches, and more preferably four inches. The funnel handle 20 has a length L2 of preferably between 1.5 and 2.5 inches and more preferably two inches, and the length L2 is preferably about half the length L1, the length L2 being selected to facilitate the cooperation of the tab 29 with the handle end 27 to hold the pivoting funnel 12a in the separated position.

A perspective view of a single serving scoop and sliding funnel 10b according to the present invention with sliding funnel 12b residing over a scoop 14b is shown in FIG. 5A and a perspective view of the single serving scoop and sliding funnel 10b is shown in FIG. 5B. The funnel 12b slides on the scoop handle 36 from a first position over the scoop 14b for pouring brewing extract 15 into the extract holder 13, to a second position separated from the scoop 14b for scooping the brewing extract 15 from the container 11. The scoop handle 36 includes rails 34 engaged by slots 38 (see FIG. 7) in a thumb rest 30 of the funnel 12b. A stop 32 on the scoop handle 36 lim its the sliding of the sliding funnel 12b. The sliding funnel 12b is just past the scoop mouth 24 when the thumb rest 30 touches the stop 32.

Figure 6A:
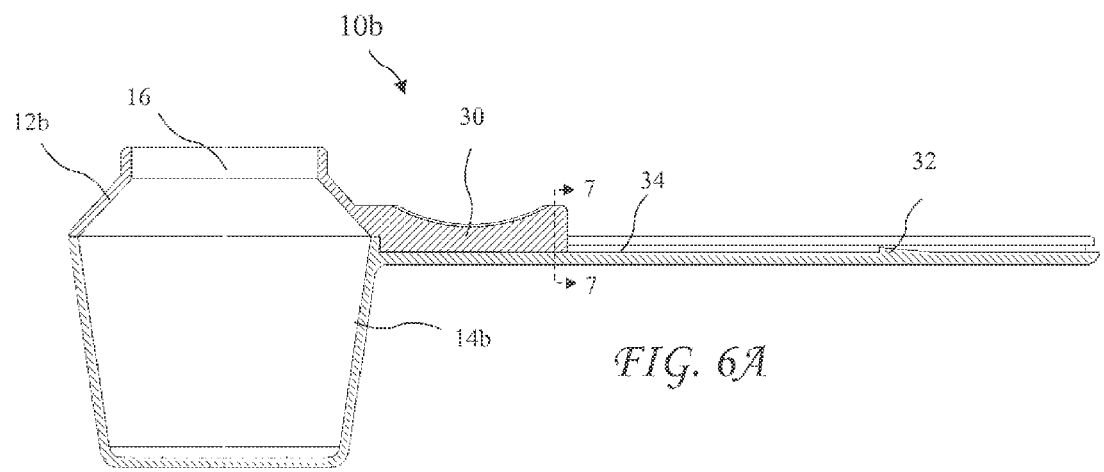
FIG. 6A shows a side view of the single serving scoop and sliding funnel according to the present invention with the funnel residing over the scoop.
Figure 6B:
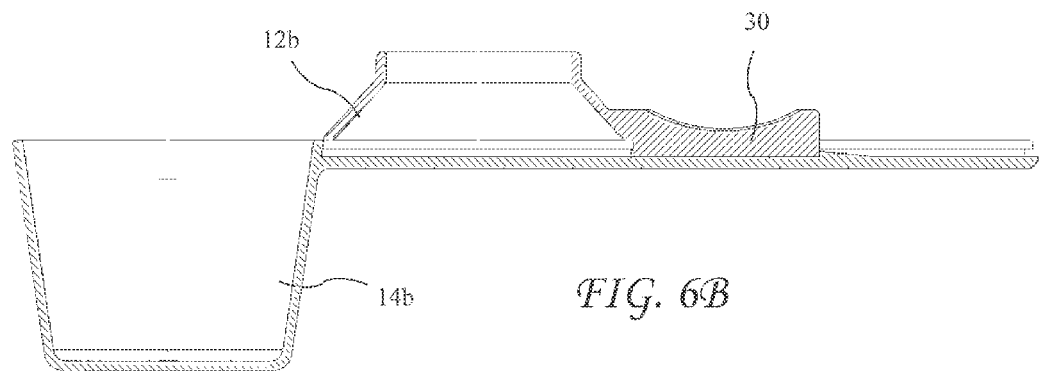
FIG. 6B shows a side view of the single serving scoop and sliding funnel according to the present invention with the funnel residing over the scoop handle.

A side view of the single serving scoop and sliding funnel 10b is shown in FIG. 6A and a side view of the single serving scoop and sliding funnel 10b with the sliding funnel 12b residing over the scoop handle 36 is shown in FIG. 6B.

Figure 7:
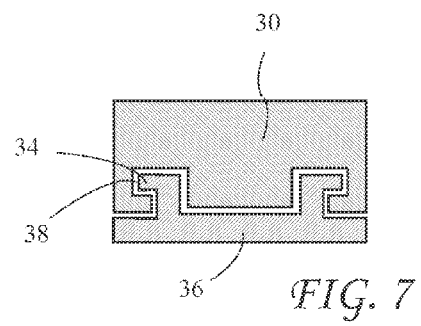
FIG. 7 shows a cross-sectional view of a thumb rest portion of the sliding funnel and a cooperating portion of the scoop handle taken along line 7-7 of FIG. 6A.

A cross-sectional view of the thumb rest portion 30 of the sliding funnel 12b and a cooperating portion of the scoop handle taken along line 7-7 of FIG. 6A is shown in FIG. 7. The slots 38 in the thumb rest engage the channel 34 of the scoop handle 30 to limit the sliding funnel 12b to sliding motion on the scoop handle 36.

Figure 8A:
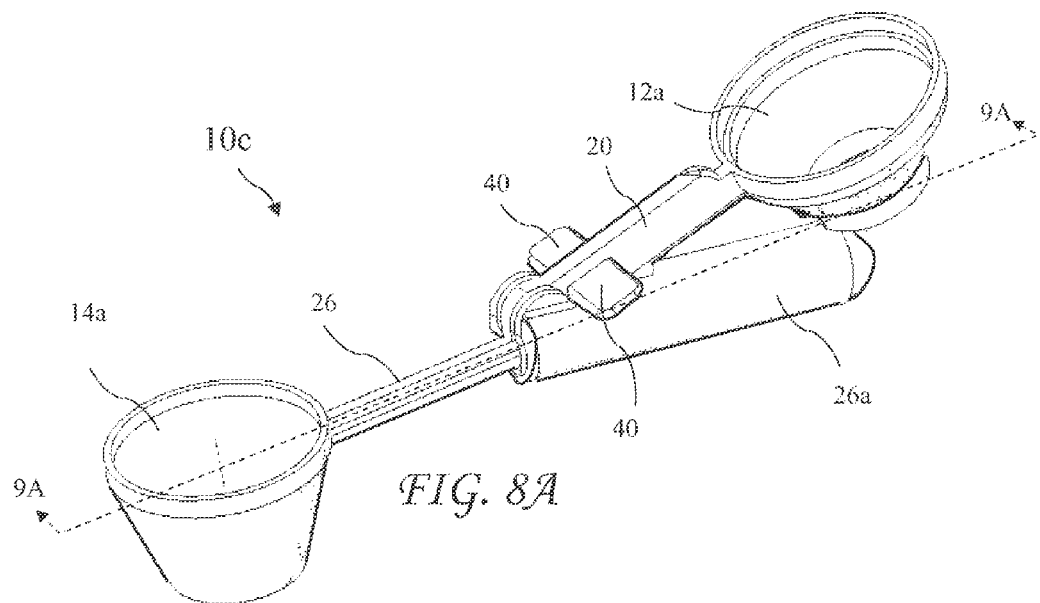
FIG. 8A shows a perspective view of single serving scoop and pivoting funnel according to the present invention.
Figure 8B:
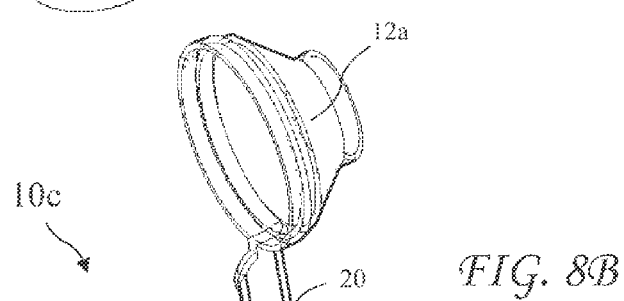
FIG. 8B shows a perspective view of the single serving scoop and pivoting funnel according to the present invention with the funnel partially pivoted towards the scoop.
Figure 8C:
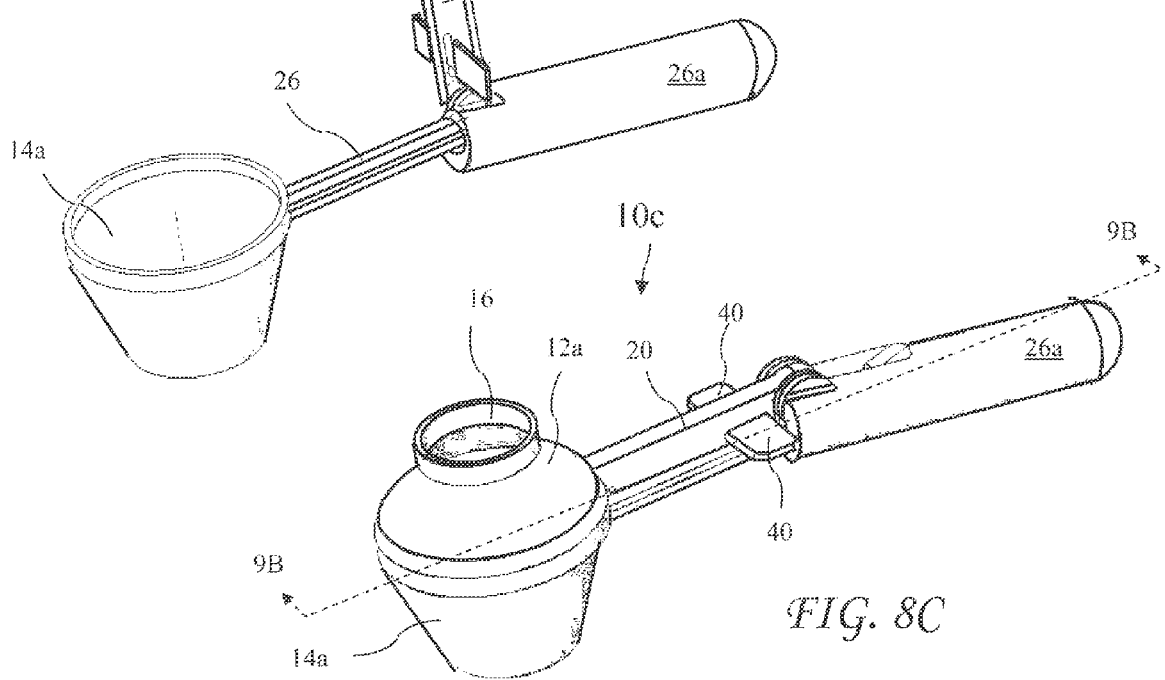
FIG. 8C shows a perspective view of the single serving scoop and pivoting funnel according to the present invention with the funnel fully pivoted to reside over to the scoop.

A perspective view of a second scoop and pivoting funnel 10c in a scooping position, according to the present invention, is shown in FIG. 8A, a perspective view of the scoop and pivoting funnel 10c with the funnel 12a partially pivoted towards the scoop 14a is shown in FIG. 8B, and a perspective view of the scoop and pivoting funnel 10c with the funnel 12a fully pivoted to reside over to the scoop 14a in a pouring position is shown in FIG. 8C. The scoop and pivoting funnel 10c is similar to the single serving scoop and pivoting funnel 10a, but includes at least one projection 40, and preferably two opposing projections 40 extending from each side of the funnel handle 20, preferably proximal to the hinge 23 (see FIG. 9A). The projections 40 may be flat (wing like), cylindrical, spherical, triangular, rectangular, etc., and a scoop and pivoting funnel with any shaped protrusion extending from the funnel handle is intended to come within the scope of the present invention. The projections 40 extend laterally from the funnel handle 20, and generally perpendicularly from the funnel handle 20.

The projections 40 permit a user to hold the scoop and pivoting funnel 10c and flip the funnel 12a over the scoop 14a with a finger or thumb of a single hand. Such single handed use is important when the user must also hold a container being filled from the scoop and pivoting funnel 10c. Further, a rear portion 26a of the scoop handle 26 is angled down at a second angle A2 of preferably between five and fifteen degrees, and preferably ten degrees. The rear portion 26a is preferably cylindrical with a spherical end or may be contoured to an easier grasp and consistent positioning of the user's hand.

A cross-sectional side view of the scoop and pivoting funnel 10c taken along line 9A-9A of FIG. 8A with the funnel 12a residing opposite to the scoop 14a is shown in FIG. 9A, and a cross-sectional side view of the scoop and pivoting funnel 10c taken along line 9B-9B of FIG. 8C with the funnel 12a fully pivoted to reside over the scoop 14a is shown in FIG. 9B. An O-ring 42 may reside around an exterior top edge of the scoop 14a (or alternatively inside a cooperating surface of the funnel 12a) to resist or prevent liquid from escaping between the scoop 14a and funnel 12a when the scoop and pivoting funnel 10c is used to measure liquids.

A hinge 23 at the base of a funnel arm 20 engages a generally mid point of the scoop handle 26, and the funnel 12a pivots through a first angle A1 between 120 and 180 degrees, and preferably between 160 and 170 degrees, and most preferably 165 degrees, to a position opposite to the scoop and snaps into place.

Figure 10:
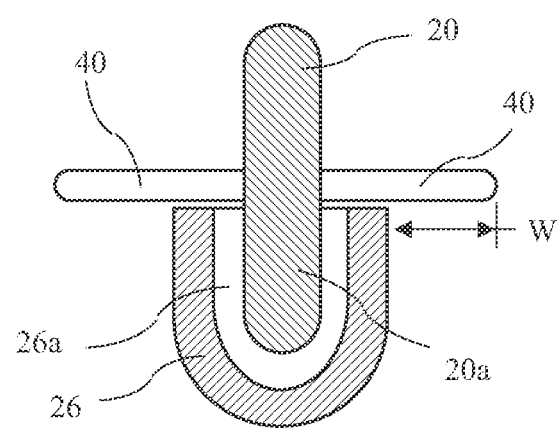
FIG. 10 shows a cross-sectional view of the funnel handle engaging the scoop handle according to the present invention, taken along line 10-10 of FIG. 9B.

A cross-sectional view of the funnel handle 20 engaging the scoop handle 26, taken along line 10-10 of FIG. 9B, is shown in FIG. 10. The scoop handle 26 includes a slot 26a, and the funnel handle 20 includes a rib 20a. When the funnel handle 20 is rotated about the hinge 23 to engage the funnel 12a with the scoop 14a, the rib 20a engages the slot 26a to align the funnel 12a with the scoop 14a. The rib 20a preferably extends the length of the funnel handle 20, and the slot 26a preferably extends the length of the scoop handle 26. The projections 40 extend laterally generally perpendicular to the funnel handle 20, a width W beyond the outside edge of the scoop handle 26. The width W is preferably at least ⅛ inches, and more preferably between ¼ and ¾ inches, and most preferably ½ inches.

While the invention herein disclosed has been described by means of specific embodiments and applications thereof, numerous modifications and variations could be made thereto by those skilled in the art without departing from the scope of the invention set forth in the claims.

I claim:

1. A scoop and pivoting funnel, comprising:
   a scoop having a volume for measuring an amount of material and having a scoop mouth;
   a scoop handle attached to the scoop and extending generally horizontally from the scoop;
   a pivot generally centered on the scoop handle;
   a funnel having a base configured to close against the scoop mouth and a smaller funnel mouth for pouring the material into a container;
   a funnel handle pivotally attached to the scoop handle by the pivot at a first end of the funnel handle, and attached to the funnel at a second end opposite to the first end, the funnel handle rotatable about the pivot between a scooping position separating from the funnel from the scoop mouth, and a pouring position aligning the base of the funnel to the scoop mouth; and
   at least one projection projecting laterally from the funnel handle at a position which allows one-handed operation for flipping the funnel to the pouring position.

2. The scoop and pivoting funnel of claim 1, wherein the projection comprises two opposing projections extending from opposite sides of the funnel handle.

3. The scoop and pivoting funnel of claim 1, wherein the projection extends at least ⅛ inches laterally from the funnel handle.

4. The scoop and pivoting funnel of claim 3, wherein the projection extends between ¼ inches and ¾ inches laterally from the funnel handle.

5. The scoop and pivoting funnel of claim 1, wherein the projection comprises two opposing projections extending from opposite sides of the funnel handle and proximal to the first end of the funnel handle.

6. The scoop and pivoting funnel of claim 1, wherein:
   the scoop handle includes a first portion and a second portion on opposite sides of the pivot;
   the first portion attaches to the scoop and is generally horizontal when the scoop resides horizontally; and
   the second portion is angled down between five and fifteen degrees.

7. The scoop and pivoting funnel of claim 6, wherein the second portion is angled down ten degrees.

8. The scoop and pivoting funnel of claim 1, wherein the funnel pivots between 120 and 180 degrees from the scooping position to the pouring position.

9. The scoop and pivoting funnel of claim 8, wherein the funnel pivots between 160 and 170 degrees from the scooping position to the pouring position.

10. The scoop and pivoting funnel of claim 1, wherein the funnel snaps into the pouring position.

11. The scoop and pivoting funnel of claim 1, wherein the scoop handle having a length L1 of four inches.

12. The scoop and pivoting funnel of claim 1, wherein the funnel handle one half the length of the scoop handle.

13. The scoop and pivoting funnel of claim 1, wherein:
   a slot resides on a top surface of the scoop handle between the scoop and the pivot; and
   the funnel handle includes a rib between the pivot and the funnel; and
   in the pouring position, the rib engages the slot.

14. The scoop and pivoting funnel of claim 1, wherein the projections are flat wings.

15. The scoop and pivoting funnel of claim 1, wherein the projections are cylindrical.

16. The scoop and pivoting funnel of claim 1, wherein the projections have a spherical shape.

17. The scoop and pivoting funnel of claim 1, wherein the projections have a triangular cross-section.

18. The scoop and pivoting funnel of claim 1, wherein the projections have a rectangular cross-section.

19. A scoop and pivoting funnel, comprising:
   a scoop having a volume of for measuring an amount of material and having an open scoop mouth;
   a scoop handle attached to the scoop and extending generally horizontally from the scoop, the scoop handle including:
   a pivot;
   a first portion attaching to the scoop and generally horizontal when the scoop resides horizontally; and
   a second portion extending from the first portion and separated from the first portion by the pivot and angled down between five and fifteen degrees below the horizontal;

a funnel having a base matched to the scoop mouth and a smaller funnel mouth separated from the base for pouring the single serving of brewing extract into a single serving holder;

a funnel handle pivotally attached to the scoop handle by the pivot at a first end of the funnel handle, and attached to the funnel at a second end opposite to the first end, the funnel handle rotatable between 120 degrees and 180 degrees about the pivot between a scooping position separating from the pivoting funnel from the scoop mouth and a pouring position aligning the base of the funnel to the scoop mouth; and two opposing projections projecting laterally from the funnel handle at a position nearer to the pivot than to the funeral and at least 1/8 inches beyond the scoop handle for flipping the funnel to reside over the scoop in the pouring position.

20. A scoop and pivoting funnel, comprising:

a scoop having a volume of for measuring an amount of material and having a scoop mouth;

a scoop handle attached to the scoop and extending generally horizontally from the scoop, the scoop handle including:
  a pivot generally centered on the scoop handle;
  a first portion attaching to the scoop and generally horizontal when the scoop resides horizontally; and
  a second portion extending from the first portion and separated from the first portion by the pivot and angled down between five and fifteen degrees below the horizontal;

a funnel having a base matched to the scoop mouth and a smaller funnel mouth separated from the base for pouring the single serving of brewing extract into a single serving holder;

a funnel handle pivotally attached to the scoop handle by the pivot at a first end of the funnel handle, and attached to the funnel at a second end opposite to the first end, the funnel handle rotatable 165 degrees about the pivot between a scooping position separating from the pivoting funnel from the scoop mouth and a pouring position aligning the base of the funnel to the scoop mouth;

a slot residing on a top surface of the scoop handle between the scoop and the pivot;

the funnel handle includes a rib between the pivot and the funnel;

in the pouring position, the rib engages the slot; and two opposing projections projecting from the funnel handle 1/2 inches perpendicularly to the funnel handle past the scoop handle, for flipping the funnel to reside over the scoop in the pouring position.

21. A scoop and pivoting funnel, comprising:

a scoop having a volume for measuring an amount of material;

a scoop mouth of the scoop, the scoop mouth open to receive the material into the scoop;

a scoop handle attached to the scoop and extending generally horizontally from the scoop;

a pivot generally centered on the scoop handle and having a pivot axis in the same plane as the scoop mouth;

a funnel having a base configured to close against the scoop mouth and a smaller funnel mouth for pouring the material into a container; and a funnel handle pivotally attached to the scoop handle by the pivot at a first end of the funnel handle, and attached to the funnel at a second end opposite to the first end, the funnel handle rotatable about the pivot axis between a scooping position separating from the funnel from the scoop mouth, and a pouring position aligning the base of the funnel to the scoop mouth; wherein a slot resides on a top surface of the scoop handle between the scoop and the pivot; the funnel handle includes a rib between the pivot and the funnel; and in the pouring position, the rib engages the slot.

* * * * *